United States Patent Office 3,520,976
Patented July 21, 1970

1

3,520,976
S-THIOCYANOMETHYL COMPOUNDS OF 2-MERCAPTOBENZOTHIAZOLES, 2 - MERCAPTOBENZOXAZOLES, AND 2 - MERCAPTOBENZIMIDAZOLES
Stanley J. Buckman, John D. Pera, and Fred W. Raths, Memphis, Tenn., assignors to Buckman Laboratories, Inc., Memphis, Tenn., a corporation of Tennessee
No Drawing. Continuation-in-part of application Ser. No. 552,693, May 25, 1966. This application Dec. 24, 1968, Ser. No. 786,752
Int. Cl. A01n *9/22, 9/28*
U.S. Cl. 424—270
11 Claims

ABSTRACT OF THE DISCLOSURE

S-thiocyanomethyl compounds of 2-cercaptobenzothiazoles, 2-mercaptobenzoxazoles, and 2-mercaptobenzimidazoles prepared by reacting a metal salt of 2-mercaptobenzothiazole, 2-mercaptobenzoxazole, 2-mercaptobenzimidazole or substituted compounds thereof with chloromethyl thiocyanate in an alcoholic solution are useful in controlling the growth of fungi and sulfate-reducing bacteria.

---

This is a continuation-in-part of application Ser. No. 552,693 filed May 25, 1966 now U.S. Patent No. 3,463,785.

This invention relates to novel organic thiocyanates, their preparation, and their use in controlling the growth of fungi and sulfate-reducing bacteria. More particularly, the products of this invention are useful in combating fungi and sulfate-reducing bacteria in industrial and agricultural processes and products.

Many industrial products, both during the process of manufacture and as the finished product, are normally susceptible to fungal degradation if means are not taken to inhibit such degradation. Wood pulp, starch and proteinaceous substances, animal hides, vegetable tanning liquors, and leather are all damaged or degraded by the growth of fungi and other microorganisms or by enzymes produced by such growth. Wet pulp containing more than about 30 percent moisture content is subject to attack by stain, mold and decay fungi. If not controlled, the result is a loss of useful fiber in badly decayed pulp, difficulty in dispersing partially decayed pulp, a darkening in color, and the development of undesirable odors caused by the growth of the microorganisms. Different species of molds are encountered at various stages in the manufacture of leather. As an example, soaking provides an environment highly conducive to the growth of microorganisms, and even strong pickle solutions are subject to attack by some microorganisms. Molds in particular may be troublesome and cause discoloration of the pickled stock, especially if it is held for a period of time. During the chrome tanning process, the chrome tanned stock held "in the blue" readily molds and is discolored. Mold growth may develop on heavy vegetable tan leather during the drying period and produce spots and stains on either the flesh or grain sides. When used in agriculture, the organic thiocyanates of our invention are used as seed, plant, and soil fungicides for protecting seeds, seedlings

2 emerging from seeds, and plants against attack by fungi.

As to the amount of the organic thiocyanate to be added to the aqueous system, a suitable quantity varies from 0.5 to 1,000 parts per million parts of moisture-free organic material. It will be understood, of course, that larger quantities of the organic thiocyanate may be used with no detrimental effect, but such larger quantities increase the costs of operation with limited material benefit.

Certain organic thiocyanates have been used rather extensively as insecticides (Donald E. H. Frear, Chemistry of the Pesticides 3rd ed., D. Van Nostrand Company, New York, 1955), but many of these compounds which have proven to be very useful as insecticides do not possess appreciable fungicidal properties.

It is, therefore, a principal object of the present invention to provide new and novel organic thiocyanates which obviate the disadvantages of the prior art compounds of this type.

These and other objects and advantages of the invention will appear as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

In brief, the foregoing objects and advantages are attained by the use of the novel compounds of our invention, which may be defined as S-thiocyanomethyl compounds of 2-mercaptobenzothiazole, 2-mercaptobenzoxazole, and 2-mercaptobenzimidazole, having the general formula:

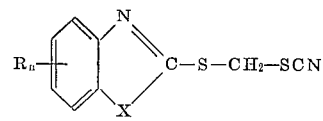

wherein X is O, NH, or S; R is hydrogen, bromo- or chloro halogen, nitro, alkyl, amino, or hydroxyl; and $n$ is 1 or 2.

The organic thiocyanates of the present invention are prepared by reacting a metal salt, preferably an alkali-metal salt, and more preferably the sodium salt of 2-mercaptobenzothiazole, 2-mercaptobenzoxazole, 2-mercaptobenzimidazole, or substituted compounds thereof wherein one or two of the hydrogens attached to the aromatic ring are replaced by bromo- or chloro halogen, nitro, alkyl, amino, or hydroxyl radicals with chloromethyl thiocyanate in an alcoholic solution. Since the reaction between the 2-mercapto compound and the chloromethyl thiocyanate is equimolecular, we generally prefer to employ these two reactants in approximately equal molecular proportions. The reaction may be effected at relatively low temperatures.

Alternatively and somewhat more preferably, these novel organic thiocyanates may be prepared by reacting a mixture comprising 2-(chloroalkylthio)benzothiazole and methylene bisthiobenzothiazole (formed by reacting bromochloromethane with a metal salt as defined above) with an alkali-metal or ammonium thiocyanate.

The compounds of our invention are liquids or solids which are soluble in common organic solvents such as alkyl and aromatic hydrocarbons, alcohols, ketones, esters, ether alcohols, dimethyl formamide, dimethyl sulfoxide, and other solvents. The addition of a surfactant to the liquid or to the solution renders the compounds of our invention readily dispersible in water. In general, non-ionic dispersants are preferred. Examples of such preferred nonionic dispersants include alkylphenoxypolyoxyethylene ethanol or alkylpolyoxyethylene ethanol. It should be understood, however, that suitable dispersants are not so limited.

In order to disclose the nature of the invention still more clearly, the following illustrative examples will be given. It is understood, however, that the invention is not to be limited to the specific conditions or details set forth in these examples, except insofar as such limitations are specified in the appended claims.

EXAMPLE 1

Preparation of 2-(thiocyanomethylthio)benzothiazole

The sodium 2-mercaptobenzothiazole used in this example was prepared by reacting 258.5 grams (1.54 moles) of a commercial grade 2-mercaptobenzothiazole with 102.8 grams (1.51 moles) of sodium ethoxide in about 400 milliliters of absolute denatured alcohol (ethanol denatured with isopropanol and methanol). This solution was cooled by means of an ice bath so as to maintain the temperature below 40° C. and treated with 162.4 grams (1.51 moles) of chloromethyl thiocyanate. The reaction mixture was maintained at a temperature of 35 to 40° C. overnight and then allowed to stand for a period of 15 days at room temperature. At the end of this period, the reaction mixture was filtered to remove the precipitated sodium chloride. The filter cake was washed first with denatured alcohol and then with methylene chloride. After combining the filtrate and the denatured alcohol wash liquor, an oil layer separated from the mixture. The oil layer so obtained was dissolved in methylene chloride and then the resulting solution was combined with the methylene chloride wash liquor, washed with water, and dried with anhydrous magnesium sulfate. The methylene chloride was removed by evaporation to yield 118.0 grams of 2-(thiocyanomethylthio)-benzothiazole as an oily liquid. An additional 242.1 grams of 2-(thiocyanomethylthio)benzothiazole was recovered from the alcohol phase by extraction with methylene chloride. Experimentally the alcohol phase was diluted with water and extracted three times with methylene chloride; the methylene chloride extracts were combined and dried over anhydrous magnesium sulfate. After evaporating the methylene chloride, the 2-(thiocyanomethylthio)benzothiazole remained as a residue, a product which could not be distilled without decomposition even at reduced pressure or recrystallized. The infrared spectrum contained a strong band at 4.62 microns, which is indicative of an organic thiocyanate.

Analysis.—Calcd. for $C_9H_6N_2S_3$ (percent): N, 11.8; S, 40.3. Found (percent): N, 11.0; S, 29.5.

EXAMPLE 2

Preparation of 2-(thiocyanomethylthio)benzoxazole

A 250-ml., three-neck, round-bottom flask equipped with stirrer, addition funnel, and thermometer was charged with 150 milliliters of absolute ethanol and 2.3 grams (0.1 mole) of sodium. After the sodium had dissolved, 15.1 grams (0.1 mole) of 2-mercaptobenzoxazole was added and the mixture stirred until a complete solution was obtained. The stirred reaction mixture was cooled and 10.75 grams (0.1 mole) of chloromethyl thiocyanate was added dropwise. After the addition was complete, the reaction mixture was stirred at room temperature overnight, then poured into 1.5 liters of water and extracted with four 150-ml. portions of ethyl acetate. The ethyl acetate extracts were combined and washed successively with one 500-ml. portion of water, one 500-ml. portion of two percent sodium hydroxide and one 500-ml. portion of water. The ethyl acetate extract was dried over magnesium sulfate and the ethyl acetate removed under reduced pressure. The residue, a dark oil (14.1 grams), $n_D^{25}$ 1.6372, represented a 63.5 percent yield of a crude product. A portion of this material was distilled under reduced pressure to give 2-(thiocyanomethylthio)benzoxazole as a clear liquid, B.P. 154–6° C. (0.2 mm.), $n_D^{25}$ 1.6427. The infrared spectrum contained a strong band at 4.62 microns, which is indicative of an organic thiocyanate.

Analysis.—Calcd. for $C_9H_7N_2OS_2$ (percent): S, 28.82. Found (percent): S, 29.30.

EXAMPLE 3

Preparation of 2-(thiocyanomethylthio)benzimidazole

A 500-ml., four-neck, round-bottom flask equipped with stirrer, addition funnel, condenser, and thermometer was charged with 300 milliliters of absolute ethanol and 4.6 grams (0.2 mole) of metallic sodium. After the sodium had dissolved, 30.0 grams (0.2 mole) of 2-mercaptobenzimidazole was added and allowed to dissolve and then 21.5 grams (0.2 mole) of chloromethyl thiocyanate was added dropwise over a period of five minutes as the stirred solution was cooled. A tan precipitate formed almost immediately and the reaction mixture was stirred at room temperature overnight, then poured into two liters of water and the solid removed by filtration. The dried crude 2-(thiocyanomethylthio)benzimidazole, 35.1 grams (79.4 percent yield), was recrystallized from toluene to give a pure sample of 2-(thiocyanomethylthio)benzimidazole, M.P. 144–145.5° C.

Analysis.—Calcd. for $C_9H_7N_3S_2$ (percent): S, 28.97. Found (percent): S, 28.94.

EXAMPLE 4

Preparation of 5-chloro-2-(thiocyanomethylthio)benzothiazole

The 4-chloro-2-(thiocyanomethylthio)benzothiazole was prepared in the same manner as Example 3, by substituting 5-chloro-2-mercaptobenzothiazole for 2-mercaptobenzimidazole. The recrystallized 5-chloro-2-(thiocyanomethylthio)benzothiazole had a M.P. of 91–92.5° C.

Analysis.—Calcd. for $C_9H_5ClN_2S_3$ (percent): Cl, 13.00; S, 35.26. Found (percent): Cl, 13.21; S, 35.40.

EXAMPLE 5

Prepartion of 5,6-dichloro-2-(thiocyanomethylthio)benzothiazole

The 5,6-dichloro-2-(thiocyanomethylthio)benzothiazole was prepared in the same manner as Example 3, substituting 5,6-dichloro-2-mercaptobenzothiazole for 2-mercaptobenzimidazole. The recrystallized 5,6-dichloro-2-(thiocyanomethylthio)benzothiazole had a M.P. of 108–110° C.

Analysis.—Calcd. for $C_9H_4Cl_2N_2S_3$ (percent): S, 31.31. Found (percent): S, 31.19.

EXAMPLE 6

Preparation of 4,6-dichloro-2-(thiocyanomethylthio)benzothiazole

The 4,6-dichloro-2-(thiocyanomethylthio)benzothiazole was prepared in the same manner as Example 3, substituting 4,6-dichloro-2-mercaptobenzothiazole for 2-mercaptobenzimidazole. The recrystallized 4,6-dichloro- 2-(thiocyanomethylthio)benzothiazole had a M.P. of 113–4° C.

*Analysis.*—Calcd. for $C_9H_4Cl_2N_2S_3$ (percent): S, 31.31. Found (percent): 31.30.

Other S-thiocyanomethyl compounds of 2-mercaptobenzothiazoles, 2-mercaptobenzoxazoles, and 2-mercaptobenzimidazoles may be prepared similarly as will be apparent to those skilled in the art. For example, alkyl, nitro, amino, or hydroxy substituted S-thiocyanomethyl compounds may be prepared by the procedure of Example 1 by merely substituting the appropriate substituted 2-mercaptobenzothiazole, substituted 2-mercaptobenzoxazole, or substituted 2-mercaptobenzimidazole for the 2-mercaptobenzothiazole of Example 1.

EXAMPLE 7

2-(chloromethylthio)benzothiazole

In a one-liter three-neck, round-bottom flask fitted with a mechanical stirrer and a reflux condenser was placed 647 grams (5.0 moles) of bromochloromethane and 200 milliliters of acetone. To this stirred mixture was added 94.6 grams (0.5 mole) of dry sodium 2-mercaptobenzothiazole at such a rate as to maintain a temperature of 35–40° C. After the addition was complete, the reaction was heated and maintained at 35–40° C. for one hour. The reaction mixture was washed twice with 200-ml. portions of water, separated and dried over anhydrous magnesium sulfate. The excess bromochloromethane was removed under reduced pressure to give 99.8 grams of a brownish crystalline solid, analyzed to be 78.4 percent 2-(chloromethylthio)benzothiazole and 21.6 percent methylene bisthiobenzothiazole.

EXAMPLE 8

2-(thiocyanomethylthio)benzothiazole

In a 500-ml. four-neck, round-bottom flask equipped with a mechanical stirrer and reflux condenser was placed 122.4 grams (0.5 mole) of crude 2-(chloromethylthio) benzothiazole (88 percent 2-(chloromethylthio)benzothiazole and 12 percent methylene bisthiobenzothiazole), 47.6 grams (0.63 mole) ammonium thiocyanate and 98 grams of acetone. The resulting mixture was refluxed for four hours and the acetone removed under reduced pressure. The residue was extracted with methylene chloride and the methylene chloride solution was washed with water and then dried over anhydrous magnesium sulfate. The solvent was removed to yield 129.5 grams of a mixture comprising 81.5 percent 2-(thiocyanomethylthio) benzothiazole and 18.5 percent methylene bisthiobenzothiazole. The 2-(thiocyanomethylthio)benzothiazole was recovered from the mixture by molecular distillation.

Other S-thiocyanomethyl compounds of 2-mercaptobenzothiazoles, 2-mercaptobenzoxazoles, and 2-mercaptobenzimidazoles were prepared following the procedures disclosed in Examples 7 and 8 by substituting a metal salt of 2-mercaptobenzoxazole, a metal salt of 2-mercaptobenzimidazole, or an appropriate substituted salt thereof or a substituted salt of 2-mercaptobenzothiazole for the metal salt of 2-mercaptobenzothiazole used in Example 7.

EXAMPLE 9

The effect of several organic thiocyanates on three fungi, *Aspergillus niger*, *Penicillium roqueforti*, and *Chaetomium globosum*, was determined in this example. The pulp-substrate method described in U.S. Pat. 3,193,-448, which disclosure is hereby made a part of this application, was utilized for these tests.

The customary periods of observation were after 7 and 14 days. Growth was recorded after each period on the basis of the following key:

4=excellent
3=good
2=poor
1=very poor, scant, questionable
0=no growth

The results are summarized in Table 1.

TABLE 1

Inhibition of *Aspergillus niger*, *Penicillium roqueforti*, and *Chaetomium globosum* by the compounds listed below in a pulp substrate method after 14 days incubation

| | | Compounds tested | | | | |
|---|---|---|---|---|---|---|
| Test organism | Concentration, parts per million | 5-chloro-2-(thiocyanomethylthio) benzothiazole | 6-nitro-2-(thiocyanomethylthio) benzothiazole | 2-(thiocyanomethylthio)-benzimidazole | 2-(thiocyanomethylthio)-benzoxazole | 2-(thiocyanomethylthio)-benzothiazole |
| *Aspergillus niger* | 0.5 | | | | | 4 |
| | 1 | 4 | 4 | 4 | 1 | 1 |
| | 3 | 4 | 3 | 4 | 0 | 0 |
| | 5 | 0 | 0 | 4 | 0 | 0 |
| | 7 | 0 | 0 | 4 | 0 | 0 |
| | 10 | 0 | 0 | 4 | 0 | 0 |
| | 15 | 0 | 0 | 4 | 0 | 0 |
| | 20 | 0 | 0 | 4 | 0 | 0 |
| | 25 | 0 | 0 | 4 | 0 | 0 |
| | 50 | 0 | 0 | 0 | 0 | |
| *Penicillium roqueforti* | 0.5 | | | | | 3 |
| | 1 | ¹0 | ¹2 | 4 | 0 | 0 |
| | 3 | ¹0 | ¹0 | 4 | 0 | 0 |
| | 5 | ¹0 | ¹0 | 4 | 0 | 0 |
| | 7 | ¹0 | ¹0 | 4 | 0 | 0 |
| | 10 | ¹0 | ¹0 | 4 | 0 | 0 |
| | 15 | ¹0 | ¹0 | 4 | 0 | 0 |
| | 20 | ¹0 | ¹0 | 0 | 0 | 0 |
| | 25 | ¹0 | ¹0 | 0 | 0 | 0 |
| | 50 | ¹0 | ¹0 | 0 | 0 | |
| *Chaetomium globosum* | 0.5 | | | | | 4 |
| | 1 | 4 | 4 | 4 | 0 | 0 |
| | 3 | 4 | 4 | 4 | 0 | 0 |
| | 5 | 2 | 3 | 0 | 0 | 0 |
| | 7 | 0 | 0 | 0 | 0 | 0 |
| | 10 | 0 | 0 | 0 | 0 | 0 |
| | 15 | 0 | 0 | 0 | 0 | 0 |
| | 20 | 0 | 0 | 0 | 0 | 0 |
| | 25 | 0 | 0 | 0 | 0 | 0 |
| | 50 | 0 | 0 | 0 | 0 | |

[1] 7 days incubation.

EXAMPLE 10

This example is concerned with a lap pulp preservation test which simulates the conditions prevailing during the storage of moist groundwood lap pulp stock in pulp and paper mills.

The lap pulp preservation tests were conducted upon a pulp substrate consisting of specimens of spruce lap pulp which weigh 2.5±0.1 grams each on an oven-dry basis and measured approximately 6 cm. x 6 cm. Each test specimen was placed into a sterilized glass petri dish and the following sequence of operations performed in duplicate for various concentrations of organic thiocyanates of this invention.

(1) A suitable amount of mineral salts was introduced into each test specimen of oven-dry lap pulp by uniformly distributing 2.0 milliliters of the following solution over the test specimen:

Ammonium nitrate—3.0 grams
Dipotassium phosphate—1.0 gram
Potassium chloride—0.25 gram
Magnesium sulfate—0.25 gram
Polyoxyethylene derivative of sorbitan monooleate—0.5 gram
Demineralized water—1000 milliliters After the test specimens were uniformly wetted, the entire series of specimens was dried in an oven at 105° C. for one hour. The petri dish covers were left partially open to facilitate drying.

(2) Two milliliters of a solution or dispersion in water containing the organic thiocyanate of this invention dissolved in water so as to provide the desired concentration in the test specimen was then added to the specimens. Untreated control specimens were prepared in duplicate by adding 2.0 milliliters of sterile water instead of the aqueous solution or dispersion of the compound being tested.

(3) The final addition to each test specimen was that of the inoculum, which contained 0.5 gram (0.5 milliliter) of water. The pulp specimens thus contained 50 percent water and 50 percent pulp. The inoculum was prepared in the following manner. With the fungi *Aspergillus niger*, *Chaetomium globosum*, and *Pullularia pullulans*, suitable spore suspensions were readily obtained from mycophil or malt agar tube slants which were added carefully to the upper side of the prepared test specimens of lap pulp.

(4) A tight-fitting wide rubber band was then placed over each petri dish with its inoculated lap pulp specimen to minimize the loss of moisture from the specimen during incubation. The temperature of incubation was 28 to 30° C.

The results are summarized in Table 2 wherein the numerical values 0 to 4 have the same meaning as in Example 9.

TABLE 2

Inhibition of *Aspergillus niger*, *Pullularia pullulans*, and *Chaetomium globosum* by the compounds listed below in a lap pulp method after 28 days incubation

| Test organism | Concentration, parts per million | Compounds tested 2-(thiocyanomethylthio)-benzothiazole | 2-(thiocyanomethylthio)-benzoxazole |
|---|---|---|---|
| *Aspergillus niger* | 10 | 4 | 4 |
|  | 25 | 4 | 4 |
|  | 50 | 3 | 0 |
|  | 75 | 0 | 0 |
|  | 100 | 0 | 0 |
|  | 200 | 0 | 0 |
|  | 400 | 0 | 0 |
| *Pullularia pullulans* | 10 | 4 | 4 |
|  | 25 | 3 | 0 |
|  | 50 | 0 | 0 |
|  | 75 | 0 | 0 |
|  | 100 | 0 | 0 |
|  | 200 | 0 | 0 |
|  | 400 | 0 | 0 |
| *Chaetomium globosum* | 10 | 4 | 4 |
|  | 25 | 4 | 1 |
|  | 50 | 0 | 0 |
|  | 75 | 0 | 0 |
|  | 100 | 0 | 0 |
|  | 200 | 0 | 0 |
|  | 400 | 0 | 0 |

The organic thiocyanates of this invention are also effective in controlling the growth and proliferation of sulfate-reducing bacteria. This is not only highly desirable but very unexpected because it has been extremely difficult to control the growth of sulfate-reducing bacteria by means of bactericides. In this regard, reference is made to the paper by G. J. Guynes and E. O. Bennett entitled "The Sensitivity of Sulfate-Reducing Bacteria to Anti-Bacterial Agents," published in Producers Monthly, November 1958. These authors studied the effects of 28 organomercurial compounds and 63 phenolic compounds on such bacteria. Of the organomercurial compounds, none inhibited the growth of sulfate-reducing bacteria at concentrations as low as 50 parts per million. This is true despite the fact that organomercurial compounds are generally the most effective and versatile bacteriostatic compounds known. In many cases, these compounds will inhibit the growth of bacteria other than sulfate-reducing bacteria at a concentration of less than 1 part per million. Of the phenolic compounds studied, also known for their general effectiveness, only three reduced the growth of sulfate-reducing bacteria at concentrations as low as 25 parts per million.

EXAMPLE 11

In this example, the effect of a composition comprising 2-(thiocyanomethylthio)benzothiazole, a solvent, and a dispersant wherein the 2-(thiocyanomethylthio)benzothiazole constituted 60 percent by weight of said composition on the growth of the sulfate-reducing bacterium *Desulfovibrio desulfuricans* was determined.

The culture of *D. desulfuricans* used was an API strain. The medium used was as follows:

| Ingredient: | Percent by weight |
|---|---|
| Sodium lactate, 60 percent | 0.532 |
| Yeast extract | 0.1 |
| Ascorbic acid | 0.01 |
| Magnesium sulfate, hydrated | 0.02 |
| Dipotassium phosphate, anhydrous | 0.001 |
| Ferrous ammonium sulfate | 0.01 |
| Sodium chloride | 1.0 |
| Distilled water, q.v. to 100 ml. | |

The foregoing medium is described in the American Petroleum Institute RP 36, "Recommended Practice for Biological Analysis of Water-Flood Injection Waters," First edition, May 1959. The medium was sterilized by autoclaving and the pH was adjusted to 7.5 with sodium hydroxide.

The culture medium above is designed to grow Desulfovibrio selecvtively from the group of bacteria that reduces sulfates but it is undoubtedly true that other species of anaerobic sulfate-reducing bacteria, such as Clostridium, are present in mixed cultures from injection waters. It should be understood that such mixed cultures are recognized by skilled bacteriologists as being more difficult to control with bactericides than pure cultures of Desulfovibrio. Furthermore, such cultures provide a more practical testing environment. The inoculum used for testing was from the third successive 24-hour transfer of an actively growing culture of sulfate-reducing bacteria. In this context, an actively growing culture is defined as a liquid culture which turns black within 24 hours after inoculation. Ten milliliters of inoculum was added to each liter of medium.

From stock solutions of the chemicals to be tested, sufficient amounts of the compounds were added to 16 x 27 mm. Pyrex test tubes so that when a test tube was completely filled, the desired concentration of chemicals was present. The amounts of stock solution added did not exceed 10 percent of the total volume of the test tubes. After the addition of the various concentrations of toxicants to the test tubes, they were completely filled with inoculated liquid medium in such a manner as to exclude all air and provide an anaerobic state. The test tubes were then capped with plastic caps containing Teflon liners and incubated at 35° C.±2° C.

All work was done in duplicate with at least three controls for each series. The controls consisted of test tubes filled with inoculated medium only. Growth of sulfate-reducing bacteria was indicated by an intense blackening of the medium, whereas, containers having sufficient chemical present to inhibit growth remained clear. It was found that less than 5 parts per million of the 2-(thiocyanomethylthio)benzothiazole completely inhibited the growth of sulfate-reducing bacteria.

As to the amount of the organic thiocyanate to be added to the system to inhibit the growth and proliferation of sulfate-reducing bacteria, heat can be stated as varying within the range of 0.5 to 20 parts per million parts of water present in the system.

Similar results were obtained in controlling the growth and proliferation of sulfate-reducing bacteria when the other organic thiocyanates of the present invention were substituted for the 2-(thiocyanomethylthio)benzothiazole used in this example.

In addition, we have found that these organic thiocyanates are not only effective in controlling sulfate-reducing bacteria but will also control the growth and proliferation of slimeforming bacteria.

The compounds of this invention may be used diluted with a carrier which may be liquid or solid. Dusts may be prepared with a finely divided solid such as talc, clay, pyrophyllite, diatomaceous earth, hydrated silica, calcium silicate, or magnesium carbonate. If desired, wetting and/or dispersing agents may be used. When the proportions of these are increased, there results a wettable powder, which may be taken up in water and applied from a spray.

Dusts may contain 1 percent to 15 percent of one or more compounds of this invention, while wettable powders may contain up to 50 percent or more of one or more of these compounds.

A typical formulation of a wettable powder comprises 20 percent to 50 percent of the organic thiocyanate compound, 45 percent to 75 percent of one or more finely divided solids, 1 percent to 5 percent of a wetting agent, and 1 percent to 5 percent of a dispersing agent. Typical wetting agents include sodium dodecyl sulfate, sodium nonylbenzene sulfonate, sodium dioctyl sulfosuccinate, octylphenoxypolyethoxyethanol, or other nonionic agents, such as ethylene and/or propylene oxide condensates with long chained alcohols, mercaptans, amines, or carboxylic acids. Typical dispersing agents include the sodium sulfonate of condensed naphthalene-formaldehyde and lignin sulfonates.

Liquid concentrates may also be used. These are prepared by taking up the organic thiocyanate compound in an organic solvent together with one or more surface active agents. For example, there may be mixed 25 parts of one of the organic thiocyanate compounds, 5 parts of a surface-active solvent-soluble alkylphenoxypolyethoxyethanol and 70 parts of one or more solvents, such as dimethyl sulfoxide or dimethyl formamide, or mixtures of these with xylene or other aromatic solvents.

The compounds of this invention may be used in conjunction with other fungicidal agents and also in conjunction with miticides or insecticides or other pesticides.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. A method of inhibiting microbiological deterioration of an organic substance that is susceptible to deterioration by the action of microorganisms, which comprises adding to said aqueous fluids the compound having the formula:

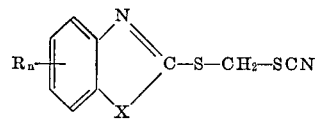

wherein X is O; NH, or S; R is hydrogen, bromine, chlorine, lower alkyl, nitro, amino, or hydroxyl; and $n$ is 1 or 2; in an amount sufficient to inhibit the growth of said microorganisms.

2. A method of inhibiting the microbiological deterioration of wood pulp that is susceptible to deterioration by the action of microorganisms, which comprises adding to said wood pulp the composition defined in claim 1 in an amount sufficient to inhibit said microbiological deterioration.

3. A method of inhibiting microbiological deterioration of an organic substance that is susceptible to deterioration by the action of microorganisms and inhibiting the formation of slime in aqueous fluids that are in contact with such substance, which comprises adding to said aqueous fluids the composition defined in claim 1 in an amount sufficient to inhibit the growth of said microorganisms.

4. A method of inhibiting the formation of microbiological slime in aqueous fluids, which comprises adding to said fluids the composition defined in claim 1 in an amount sufficient to inhibit the formation of said slime.

5. A method of controlling the growth and proliferation of sulfate-reducing bacteria in secondary recovery petroleum operations, which comprises adding to the water in such systems the composition defined in claim 1 in an amount sufficient to inhibit the growth and proliferation of sulfate-reducing bacteria.

6. In the production of petroleum in secondary recovery petroleum operations, the method of inhibiting deterioration of the crude oil-water mixture by the growth of sulfate-reducing bacteria in the water, which comprises adding to the aqueous fluids the composition defined in claim 1 in an amount sufficient to inhibit the growth of sulfate-reducing bacteria.

7. A method of controlling the growth and proliferation of sulfate-reducing bacteria as well as species of slime-forming mbicroorganisms in secondary recovery petroleum operations, which comprises adding to the water in such systems the composition defined in claim 1 in an amount sufficient to inhibit the growth and proliferation of sulfate-reducing bacteria and slime-forming microorganisms.

8. A method of inhibiting the growth and proliferation of microorganisms, which comprises contacting said microorganisms with the composition defined in claim 1 in an amount sufficient to inhibit the growth and proliferation of said microorganisms.

9. A method of inhibiting the growth and proliferation of microorganisms on seeds and living plants, which comprises applying to said seeds and living plants the composition defined in claim 1 in an amount sufficient to inhibit the growth and proliferation of said microorganisms.

10. A method of inhibiting the growth and proliferation of microorganisms in soils, which comprises adding to said soils the composition defined in claim 1 in an amount sufficient to inhibit the growth and proliferation of said microorganisms.

11. A method of inhibiting the deterioration of an organic substance that is susceptible to deterioration by the section of microorganisms, which comprises adding to said organic substance a compound having the formula of claim 1 in an amount sufficient to inhibit the growth and proliferation of said microorganisms.

References Cited

UNITED STATES PATENTS 3,193,448 7/1965 Buckman et al. _____ 162—161
3,463,785 8/1969 Buckman et al. _____ 260—306.6

SHEP K. ROSE, Primary Examiner

U.S. Cl. X.R.

8—94.27, 94.32; 47—57.6, 58; 162—161, 190; 252—8.55, 8.57; 424—272, 273